United States Patent [19]

Sekine et al.

[11] 4,023,745
[45] May 17, 1977

[54] ENDLESS TAPE CARTRIDGE

[76] Inventors: Masaoki Sekine; Haruo Shiba, both of c/o TDK Electronics Co., Ltd., 2-14-16 Uchikanda, Chiyoda, Tokyo, Japan

[22] Filed: Mar. 26, 1975

[21] Appl. No.: 562,125

Related U.S. Application Data

[63] Continuation of Ser. No. 400,401, Sept. 24, 1973, abandoned.

[52] U.S. Cl. .......................................... 242/55.19 A
[51] Int. Cl.² .......................................... B65H 17/48
[58] Field of Search ............ 242/55.19 A, 55.19 R; 179/100.22

[56] References Cited

UNITED STATES PATENTS

| 2,363,627 | 11/1944 | Van der Schalie | 242/55.19 A |
| 2,921,787 | 1/1960 | Cousino | 242/55.19 A |
| 2,951,654 | 9/1960 | Steelman | 242/55.19 A |
| 3,245,630 | 4/1966 | Morris et al. | 242/55.19 A |

*Primary Examiner*—William D. Martin, Jr.
*Attorney, Agent, or Firm*—Kane, Dalsimer, Kane, Sullivan and Kurucz

[57] ABSTRACT

An endless tape cartridge has upper and lower casings, and a reel contained in a room formed in the casings and consisting of a winding core and a disc, wherein an endless tape is led from the central portion of the reel to the peripheral portion thereof through the outside of the reel. The inner surface of the disc which is brought into contact with one side of the endless tape is separated into internal and external areas in a radial direction. The internal area has a layer with a friction factor smaller than that of the external area.

1 Claim, 2 Drawing Figures

ENDLESS TAPE CARTRIDGE

This application is a continuation of prior application Ser. No. 400,401, filed Sept. 24, 1973, now abandoned.

DETAILED DESCRIPTION OF THE INVENTION

The present invention relates to an endless tape cartridge of such a Lear-jet distinguished from that of the prior art by the improvements in its construction which is capable of being inexpensively manufactured and used effectively for a long time.

Figure 1:
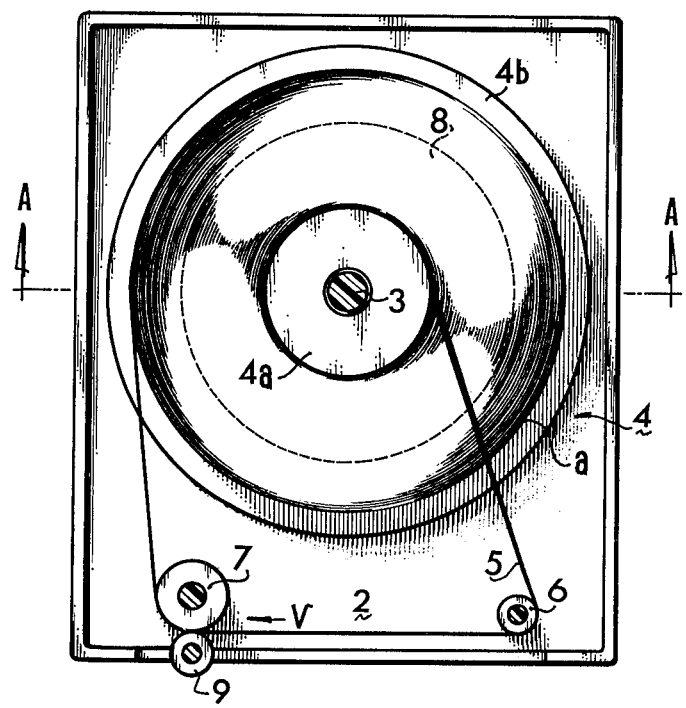
Figure 2:
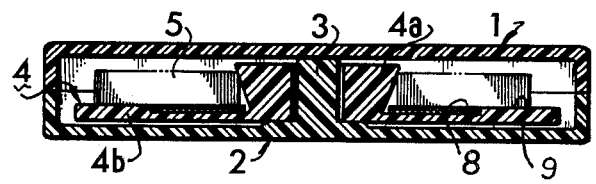

The features and advantages of the present invention will be apparent and understood from the following description with reference to the accompanying drawings, in which:

FIG. 1 is plan view of an endless tape cartridge embodying the present invention wherein an upper casing is removed to show the internal parts thereof; and FIG. 2 is a cross-sectional side view taking along the line A—A of FIG. 1.

An endless tape cartridge shown in FIGS. 1 and 2 has an upper casing 1 and a lower casing 2, both being made of a plastic such as polystyrene. The lower casing 2 involves an axis 3 integrally formed with the body thereof for rotatably supporting a reel 4 which is made of plastics such as polystyrene and ABS.

The reel 4 consists of a winding core 4a into which the axis 3 is detachably inserted, and a disc 4b integrally and coaxially formed with the winding core 4a. To the winding core 4a there is loosely wound an endless tape 5 so as to form a pile in a region from the periphery of the core 4a to a position slightly inside of the periphery of the disc 4b.

The tape 5 is led from the inner portion of the pile with the surface of the tape 5 guided along the tapered surface of the winding core 4a, to the external portion of the pile via a guide pole 6 and a pinch roller 7. The upper surface of the disc 4b is brought into contact with the side of the endless tape and separated into internal and external areas in a radial direction. On the internal area of the disc 4bl is mounted a layer 8 of a material having a small friction factor, such as molybdenum disulfide, carbon, graphite and fluorine-containing resin such as "Teflon (trade name), " by means of coating or molding. The layer 8 may also formed by using a sheet made of a material set forth above.

When the tape 5 runs at a constant velocity V, by rotation of the pinch roller 7 pressed against a capstan 9, the portion of the tape 5 drawn out of the central portion of the reel will have a velocity of $$v_1 = \omega r_1$$

where
$\omega$: angular velocity of the reel (determined as a constant)
$v_1$: radial of the winding core.

In this case, a force operates on the tape 5 at the portion near the winding core 4a in a manner to cause the tape to be pinched to the center, thereby the velocity of the winding core 4a necessarily has the same value as to that of the tape 5, due to the integral construction of the winding core 4a and disc 4b, as the tape is drawn out of the innermost portion of the pile.

After passed through the interval between the capstan 9 and pinch roller 7 the tape 5 is withdrawn into the outermost portion of the pile because the pile of the wound tape is rotated with the disc 4b by the friction produced between the upper surface of the disc 4b and a lower edge of the tape.

Nevertheless, the angular velocities of the tape 5 at the innermost and outermost positions are equal to each other, and then the velocity $v_1$ at the innermost portion is smaller than the velocity $v_2$ at the outermost portion as indicated by the inequality $v_1 < v_2$.

According to the prior art, since the tape on the disc is pinched to be urged toward the center of the winding by the friction generated between the tape and disc of the reel during the rotation of the reel, the tape drawn out of the innermost portion is always loaded with a pressure given by the pinching operation. The loading results in undesirable influences such as a lowered running performance and a restricted life of the tape.

In accordance with the present invention, since the disc 4b has a low friction layer 8 at the internal area, and the friction factor $\mu_2$ of the internal area is smaller than the friction factor $\mu_1$ of the external area, the pinching load to the tape at the internal area is significantly reduced, whereby the tape is released from the influences mentioned above. For example, the friction factor $\mu_2$ is defined by a value of $2/3$ the factor $\mu_1$. Furthermore, the cartridge of this invention will result in preventing the tape from being deteriorated so as to maintain the long life of the tape, and improving the running performance on account of the small tape-drive power.

Of course, the disc 4b may be separated into more than two areas in a radial direction and the smaller friction of the friction layers is defined on the separate area in the order from the innermost one to the outermost one. Accordingly, in FIG. 2, area 9 would have a higher friction factor than area 8 but lower than the external area of the disc.

What is claimed is:

1. In an endless tape cartridge of the type having an upper casing, a lower casing, a room formed in the casings, a winding axis extending from one casing toward the other casing, a reel within the room having a core disposed about the axis, and an endless tape disposed about the reel extending from a central portion of the reel to the periphery thereof, the improvement comprising a tape supporting disc formed integral with and extending radially outwardly from said core, said disc having a tape supporting surface including a first area extending radially outwardly from said core and a second area extending radially outwardly from said first area, both said first and second areas supporting convolutions of said tape, said first area only having a layer of material thereon whereby the friction factor of a said first area is reduced as compared to the friction factor of said second area.

* * * * *